UNITED STATES PATENT OFFICE.

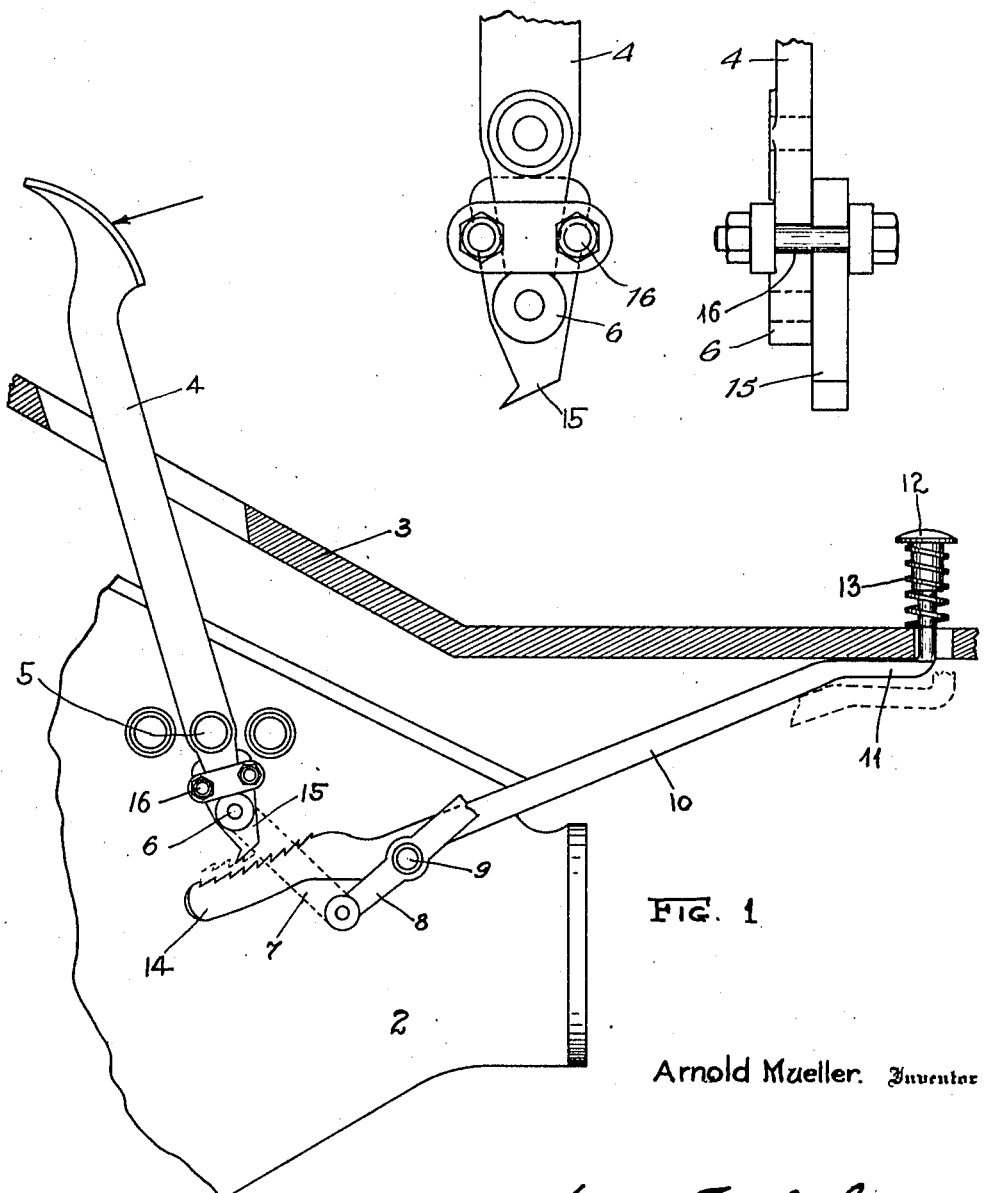

ARNOLD MUELLER, OF DENVER, COLORADO.

CONTROL MEANS FOR AUTOMOBILE LOW-SPEED LEVERS.

1,314,418.  Specification of Letters Patent. Patented Aug. 26, 1919.

Application filed June 21, 1918. Serial No. 241,187.

*To all whom it may concern:*

Be it known that I, ARNOLD MUELLER, a citizen of Republic of Switzerland, residing at Denver, in the county of Denver and State of Colorado, have invented certain new and useful Improvements in Control Means for Automobile Low-Speed Levers, and I do hereby declare the following to be a full, clear, and exact description of the invention, such as will enable others skilled in the art to which it appertains to make and use the same.

This invention relates to control means for the low speed lever of a gear-set mechanism on automobiles.

The object of the present invention is to provide a simple, practicable, relatively inexpensive and easily applied means for controlling or temporarily holding the yieldable low speed lever of a well known type of motor vehicle, so as to relieve the operator of the burden of holding down the lever against its tending to automatically return to neutral. It is also an object of the invention to provide a device of this character which is easily operated and controlled at the will of the operator, and which may be applied to an automobile without any expensive alteration, machining, or change of structure of the usual parts of the outfits.

With the above and other objects in view which will be rendered manifest in the following specification, the invention consists of the construction, the combination, and the details and arrangements of elements, more particularly as hereinafter described with reference to an embodiment of the invention illustrated in the accompanying drawings in which—

Figure 1 is a side elevation of a portion of the gear-set casing and showing in section a portion of the floor of the car.

Fig. 2 is a large detail view of the pawl attached to the lever.

Fig. 3 is an edge view of Fig. 2.

In the drawing 2 represents a portion of the housing or gear-set of a well known type of motor driven vehicle, this housing being located below the platform of flooring 3 through which there extends a low speed gear lever or pedal 4 mounted on a fulcrum 5 attached to the side of the gear casing 2, the lower end of this lever being provided with an eye 6 to receive a link shown in dotted lines 7 connected to the adjacent end of the lever 8 on the rock shaft 9. The foot pedal 4 is normally maintained in a neutral position and is yieldingly supported so that when pressed in the direction of the arrow at its upper end throws in the low speed gears. To relieve the operator of the burden of holding down this pedal 4 against this resisting or return action, I have provided an efficient and simple means consisting of a pawl and ratchet mechanism, one of which is connected to the pedal 4, the other of which is connected to a lever 10, pivoted on the rock shaft 9, and which is provided with an L-shaped portion 11 having an arm extending up through an aperture in the floor 3, the upper end of the arm having a button 12 reacted upon by a spring 13. In the present organization the lower end of the lever 10 is provided with a segmental rack 14, and that swings to engage the point of a pawl 15 shown as applied to one side of the lower end of the pedal 4 and appropriately secured thereto as by means of a U clamp 16. The pitch of the teeth of the rack 14 is such that when the pedal 4 is pressed at its upper end in the direction of the arrow the pawl 15 is carried toward the fulcrum 9 of the lever 10, and when the pawl is engaged by the rack 14 by a downward pressure on the button 12 of the lever 10 the pawl and rack are interlocked and temporarily held in engagement to prevent the automatic return of the pedal 4 to the neutral position. This relieves the operator of the necessity of holding his foot on the upper end of the lever so long as it is desired to maintain the gear-set in the low speed position.

When it is desired to release the pedal 4 from control of the rack 14, it is only necessary to slightly press the pedal 4 in the direction of the arrow whereupon the spring 13 will automatically disengage the rack from the pawl and the former returns to its former disengaged position.

What is claimed is:

1. A lever lock, for an automobile gear-set, comprising, in combination with the usual low speed lever, a pawl immovably fixed thereon, and a normally disengaged locking device for interlocking with the pawl to hold the lever thrown in low-speed position.

2. A lever lock, for an automobile gear-set, comprising, in combination with the usual low speed lever, a pawl immovably fixed thereon, a normally disengaged locking device for interlocking with the pawl to hold the lever thrown in low-speed position, and manually operative means for interlocking the device and said lever.

3. The combination with a yieldable low speed lever of an automobile gear set, of a pawl fixed to the lever, a normally disengaged ratchet disposed to interlock with the pawl to hold it against return, and means independent of the lever for throwing the ratchet against the pawl.

4. The combination with a low speed, yieldable pedal of an automobile gear-set, of locking means comprising a manually operable lock lever mounted independently of the pedal, and a pawl and ratchet device, one of which is attached to the pedal and the other to the lever.

In testimony whereof I affix my signature.

ARNOLD MUELLER.

Copies of this patent may be obtained for five cents each, by addressing the "Commissioner of Patents, Washington, D. C."